(12) United States Patent
Robertson et al.

(10) Patent No.: US 8,925,735 B2
(45) Date of Patent: *Jan. 6, 2015

(54) SIFTING SCREEN

(75) Inventors: Graham Robertson, Edinburgh (GB); Brian Carr, Burlington, KY (US); Eric Cady, Florence, KY (US)

(73) Assignee: M-I L.L.C., Houston, TX (US)

( * ) Notice: Subject to any disclaimer, the term of this patent is extended or adjusted under 35 U.S.C. 154(b) by 607 days.

This patent is subject to a terminal disclaimer.

(21) Appl. No.: 12/995,482

(22) PCT Filed: Jul. 8, 2009

(86) PCT No.: PCT/GB2009/050802
§ 371 (c)(1),
(2), (4) Date: Mar. 1, 2011

(87) PCT Pub. No.: WO2010/004325
PCT Pub. Date: Jan. 14, 2010

(65) Prior Publication Data
US 2011/0266214 A1     Nov. 3, 2011

(30) Foreign Application Priority Data
Jul. 10, 2008 (GB) .................................. 0812628.6

(51) Int. Cl.
*B01D 39/10* (2006.01)
*B07B 1/46* (2006.01)
*B01D 33/03* (2006.01)
*B01D 33/00* (2006.01)

(52) U.S. Cl.
CPC .............. *B07B 1/46* (2013.01); *B01D 33/0376* (2013.01); *B07B 1/4645* (2013.01)
USPC ........... 210/499; 210/384; 209/405; 209/409; 209/412

(58) Field of Classification Search
CPC .... B01D 33/0376; B01D 1/46; B01D 1/4645; B01D 1/4618; B01D 1/4636; B01D 1/4663; B01D 1/469; B01D 39/12
USPC .......... 210/499, 498, 485, 495, 384; 209/405, 209/412, 409, 366, 392, 397, 408, 384
See application file for complete search history.

(56) References Cited

U.S. PATENT DOCUMENTS 2,161,500 A    5/1939   Bird et al.
2,462,878 A    3/1949   Logue
(Continued)

FOREIGN PATENT DOCUMENTS

CA     970724     7/1975
CA    2664173     4/2008
(Continued)

OTHER PUBLICATIONS

Written Opinion in PCT/GB2009/050802 dated Oct. 1, 2009.
(Continued)

*Primary Examiner* — Nam Nguyen
*Assistant Examiner* — Madeline Gonzalez
(74) *Attorney, Agent, or Firm* — Patents+TMS, P.C.

(57) ABSTRACT

The invention relates to a screen frame adapted for use in a shaker to separate solids from a liquid/solid mixture and to which woven wire mesh is to be attached, comprising an outer perimeter and a plurality of plastics ribs extending between opposing regions of the perimeter, the plastics ribs together forming an upper face and a lower face, wherein the frame further comprises at least one metal rib extending between opposing regions of the perimeter and extending from the upper face to the lower face, and to a shaker comprising at least one such screen frame.

19 Claims, 2 Drawing Sheets

(56) References Cited

U.S. PATENT DOCUMENTS

| | | |
|---|---|---|
| 3,970,552 A | 7/1976 | Bongert |
| 4,298,572 A | 11/1981 | Moffet et al. |
| 4,350,591 A | 9/1982 | Lee |
| 4,397,659 A | 8/1983 | Gowan et al. |
| 4,492,862 A | 1/1985 | Grynberg et al. |
| 4,546,783 A | 10/1985 | Lott |
| 4,635,735 A | 1/1987 | Crownover |
| 4,639,258 A | 1/1987 | Schellstede et al. |
| 4,674,251 A * | 6/1987 | Wolff .................. 52/309.15 |
| 4,725,352 A | 2/1988 | Haliotis |
| 4,750,920 A | 6/1988 | Manuel et al. |
| 5,049,262 A | 9/1991 | Galton |
| 5,341,882 A | 8/1994 | Hale |
| 5,431,882 A | 7/1995 | Nokihara et al. |
| 6,092,390 A | 7/2000 | Griffith |
| 6,164,380 A | 12/2000 | Davis |
| 6,170,580 B1 | 1/2001 | Reddoch |
| 6,389,818 B2 | 5/2002 | Cho et al. |
| 6,389,878 B1 | 5/2002 | Zamfes |
| 6,565,698 B1 * | 5/2003 | Adams et al. ............ 156/290 |
| 6,607,659 B2 | 8/2003 | Hensley et al. |
| 7,096,942 B1 | 8/2006 | de Rouffignac et al. |
| 7,740,761 B2 | 6/2010 | Bailey |
| 7,767,628 B2 | 8/2010 | Kippie et al. |
| 8,394,270 B2 | 3/2013 | Vasshus et al. |
| 2002/0056667 A1 | 5/2002 | Baltzer et al. |
| 2004/0154963 A1 | 8/2004 | Rayborn |
| 2005/0054623 A1 | 3/2005 | Dudley |
| 2005/0183994 A1 | 8/2005 | Hensley et al. |
| 2006/0016768 A1 | 1/2006 | Grichar et al. |
| 2006/0113220 A1 | 6/2006 | Scott et al. |
| 2006/0254421 A1 | 11/2006 | Boone |
| 2007/0221547 A1* | 9/2007 | Robertson .................. 209/399 |
| 2007/0245839 A1 | 10/2007 | Rieberer |
| 2008/0078699 A1 | 4/2008 | Carr |
| 2008/0078700 A1 | 4/2008 | Jones et al. |
| 2008/0078701 A1 | 4/2008 | Carr |
| 2008/0078703 A1 | 4/2008 | Robertson |
| 2008/0093269 A1 | 4/2008 | Timmerman |
| 2010/0012556 A1 | 1/2010 | Phole |
| 2011/0284481 A1 | 11/2011 | Pomerleau |
| 2012/0279932 A1 | 11/2012 | Pomerleau |
| 2013/0074360 A1 | 3/2013 | Pomerleau |
| 2013/0092637 A1 | 4/2013 | Pomerleau |

FOREIGN PATENT DOCUMENTS

| | | |
|---|---|---|
| CA | 2712774 | 11/2010 |
| DE | 3542635 C1 | 2/1987 |
| DE | 102006018870 B3 | 7/2007 |
| GB | 1483217 | 8/1977 |
| GB | 2089403 | 5/1982 |
| GB | 2421206 A | 6/2006 |
| WO | WO-03/005736 A1 | 7/2003 |
| WO | WO-03/057376 A1 | 7/2003 |
| WO | WO2005/054623 | 6/2005 |
| WO | WO2010/048718 | 5/2010 |
| WO | WO2011/113132 | 9/2011 |
| WO | WO2011/140635 | 11/2011 |

OTHER PUBLICATIONS

Search Report in GB0812628.6 dated Nov. 10, 2008.
Pomerleau, PCT/CA2011/000542, International Written Opinion, Oct. 25, 2011.
Pomerleau, PCT/CA2010/000501, International Written Opinion, Jul. 10, 2010.
Pomerleau, PCT/CA2011/000542, International Search Report, Oct. 25, 2011.
Pomerleau, PCT/CA2010/000501, International Search Report, Jul. 10, 2010.
Document from Impeachment Proceedings Related to Canadian Patent No. 2,712,774; Reply to Defence and Counterclaim; Feb. 21, 2013; 7 pages.
Document from Impeachment Proceedings Related to Canadian Patent No. 2,712,774; Statement of Claim; Oct. 26, 2012; 82 pages.
Document from Impeachment Proceedings Related to Canadian Patent No. 2,712,774; Statement of Defence and Counterclaim; Dec. 21, 2012; 13 pages.
Office Action & English Translation; Russian Patent Application No. 2011120971; May 8, 2013.

* cited by examiner

SIFTING SCREEN

FIELD OF THE INVENTION

The invention relates to sifting screens which in use are fitted to a shaker to separate solids from liquids and in particular to separate solids from liquid drilling muds brought up from down-hole when drilling for oil or gas.

BACKGROUND TO THE INVENTION

Efficiently separating solids from liquids is a widespread technical problem. One of the most practical and robust methods of achieving this remains the use of a sieve, or screen, to sift the solids from the mixture of liquid and solid.

When drilling for oil and/or gas, synthetic drilling fluids, or muds, are used. As these muds are relatively expensive to manufacture, once used they are typically recovered in a process including sifting rock, shale and other debris from the mud. This involves the use of a so-called shaker which has fitted, one or more sifting screens, made up of a screen frame with one or more sheets of woven wire mesh, or screen, stretched over and secured to it. In use, the shaker vibrates the sifting screen or screens, to aid the sifting process.

In order for such sifting screens to be able to withstand the rigours of such a process, they must have a certain rigidity and be very hard-wearing. This has resulted in a design of sifting screen having a screen frame which has a plurality of reinforcing "ribs". A common design of screen frame is rectangular comprising an outer rectangular perimeter with each side connected to its opposing side by a plurality of ribs. Such a design results in a plurality of rectangular openings. Typically the screen is attached not only to the rectangular perimeter but also to the ribs, to provide better adhesion of the screen to the frame and prolonging its lifetime.

In view of the fact that sifting screens are man-handled into position, such screen frames have for some time been made from plastics material to reduce weight. A common design of plastics screen frame is reinforced by including a metal wire structure, embedded within the plastics rectangular perimeter and rib arrangement.

However, despite the measures taken to provide sufficient rigidity, the present inventors have found that vibratory motion typically involved in shakers is not successfully transmitted by the screen frame to the attached screen. Excessive motion of screens has been observed, known as "whipping", which can result in erratic solids conveyancing and premature screen failure.

SUMMARY OF THE INVENTION

The present invention relates to a screen frame adapted for use in a shaker to separate solids from a liquid/solid mixture and to which woven wire mesh is to be attached, comprising an outer perimeter and a plurality of plastics ribs extending between opposing regions of the perimeter, the plastics ribs together forming an upper face and a lower face, wherein the frame further comprises at least one metal rib extending between opposing regions of the perimeter and extending from the upper face to the lower face.

The at least one metal rib provides rigidity to the screen frame without significantly increasing its weight.

Preferably the frame has a perimeter consisting of four straight sides, e.g. rectangular, the plastics ribs extending between both pairs of opposing regions, forming a plurality of rectangular openings.

The frame is adapted to be fitted in a shaker of a particular type and clamped on at least two sides of the perimeter. The frame is arranged such that the at least one metal rib extends between regions of the perimeter which are, in use, clamped in place in the shaker. If the frame is rectangular then preferably it is clamped along its long sides, for increased rigidity.

In use, the frame according to the invention is forced to vibrate in an upwards and downwards sense (i.e. orthogonal to the upper and lower faces) by the shaker it is fitted in. The liquid/solid mixture to be separated is then passed across the at least one frame according to the invention, generally from one side of the perimeter to the opposing side. This vertical vibrating motion is usually also accompanied by lateral motion in the direction of passage of the liquid/solid mixture. This lateral motion may be in phase with the vertical motion to produce a diagonal motion of the frame, moving in the same general direction as the direction of the passing liquid/solid mixture as the frame moves upwards. Alternatively, the lateral motion may be out-of-phase with the vertical motion, e.g. to produce an elliptical motion of the frame. Consequently, the frame moves in the opposite general direction of the passing liquid/solid mixture as the frame moves downwards. This motion has the effect of conveying the solids across the surface of the frame and may conveniently be approximately 45° to vertical.

Most commonly the lateral vibrating motion of the frame in use is parallel with the clamped sides of the rectangular frame, so that the solids flow is also parallel to the clamped sides. However it is also possible that the lateral vibrating motion in use is orthogonal to the clamped sides.

It is also possible that all four sides of the rectangular frame are clamped. In this case the at least one metal rib may extend between either pair of sides. One possibility is to have at least one metal rib extending between one pair of opposing sides and another at least one metal rib extending between the other pair of sides.

The perimeter is preferably made of plastics, e.g. GRP plastics and has a thickness, extending from the upper face to the lower face of from 3 to 8 cm. The plastics ribs are preferably made from the same material as the perimeter for simplicity, and preferably also have substantially the same thickness, providing a well-defined upper face and a lower face to the frame.

When rectangular the perimeter may comprise long sides having a length of, for example, from 40 to 100 cm and short sides having a length of, for example, from 20 to 70 cm, and will have dimensions chosen so as to fit snugly into the particular shaker it is adapted for use in.

Having more metal ribs has been found to give increased rigidity, however at increasing weight. Preferably therefore, the frame comprises from one to five metal ribs, preferably from two to four metal ribs. Three metal ribs have been found to provide a good optimum rigidity without excessive weight increase.

The ends of the metal ribs ideally are located at or within the perimeter material to give optimal rigidity. However, the ends could fall short of the perimeter by a small distance, provided that another material was employed to connect the metal ribs to the perimeter. Generally the at least one metal rib will extend at least 90% of the distance between the opposing regions it extends between.

The at least one metal rib also extends from the upper face to the lower face. Preferably the at least one metal rib extends from 50% to 100% of the distance from the upper face to the lower face, more preferably from 60% to 90%.

The at least one metal rib is typically straight with a constant rectangular cross-section. The length of the sides of the rectangular cross-section extending between the upper and lower faces is preferably much greater than the short sides of the rectangular cross-section. Having short sides in cross-section, or "thin" ribs, reduces weight without significant reduction in rigidity. Typically the at least one metal ribs are less than 1.0 cm in thickness.

Thus, a typical dimension for a metal rib for use in the invention is 50 cm×5 cm×0.5 cm.

The at least one metal rib may be used as it is or, preferably, may be encased in surrounding plastics material. Preferably it is encased in the same plastics material as forms the plastics ribs and so that the dimensions of the encased metal rib are substantially, or exactly, the same as those of the plastics ribs.

Preferably the at least one metal rib has a plurality of holes. This not only reduces weight without significantly affecting rigidity but also aids the passage of molten plastics when encasing the metal ribs, if this is desired. The at least one metal rib may be made out of any suitable metal, e.g. steel.

In a preferred embodiment, some or all of the plastics ribs are reinforced with internal wires. Preferably the wires extend fully inside the ribs, terminating at or in the perimeter. The ends of the wires may be connected by a further wire running through the perimeter material, thus forming a wire mesh structure, encased in plastics ribs and perimeter material.

In a further refinement, the wire mesh may have a second layer of wire mesh structure so that two wires run through at least some of the plastics ribs, one above the other. The second layer, if present, is above the first layer and is typically rigidly connected to it. Lengths of wire bent to form spacers and adapted to fit between upper and lower wire structures may be welded or otherwise joined to the upper and lower wires, so as to extend therebetween and maintain the desired separation of the two layers of wires. The spacers are preferably wholly contained within the plastics material forming the ribs.

In a preferred embodiment the at least one metal rib takes the place of a reinforcing wire or wires and is connected to the wire mesh structure and preferably also to the second layer of wire mesh structure, if present.

In another aspect, the invention relates to a shaker comprising at least one screen frame according to the invention clamped in position.

The invention also relates to a process of separating solids from a liquid/solid mixture comprising employing at least one screen frame according to the invention clamped into position in a shaker.

The invention will now be described, by way of example, with reference to the following figures, in which.

Figure 1:
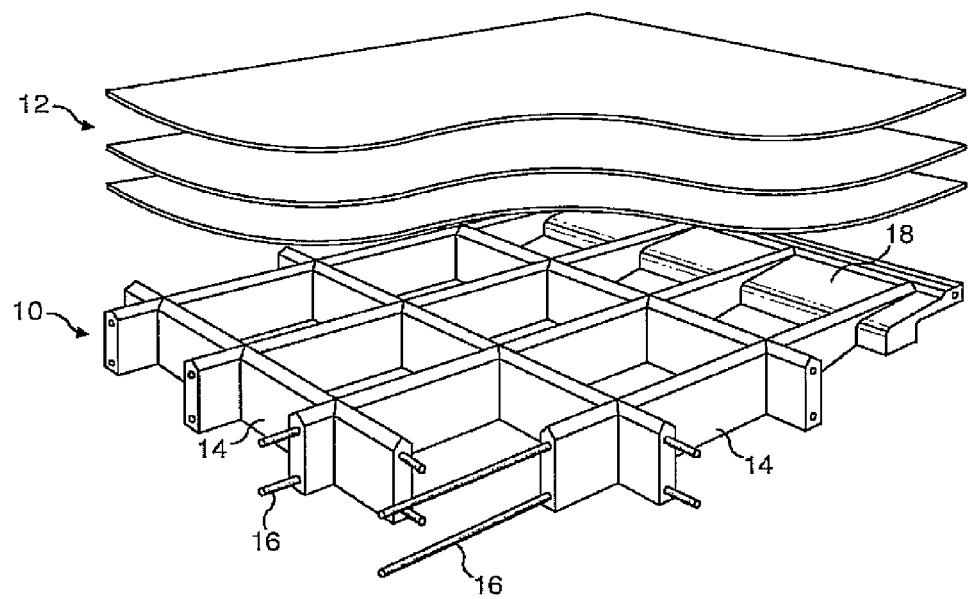
FIG. 1 is an exploded perspective view of a part of a known screen.

FIG. 1 shows a known screen frame 10 showing an exploded view of three layers of woven wire mesh 12. The frame 10 comprises an orthogonal array of plastics ribs 14 reinforced with two layers of wires 16. The ribs are integrally formed with part of a rectangular perimeter 18.

Figure 2:
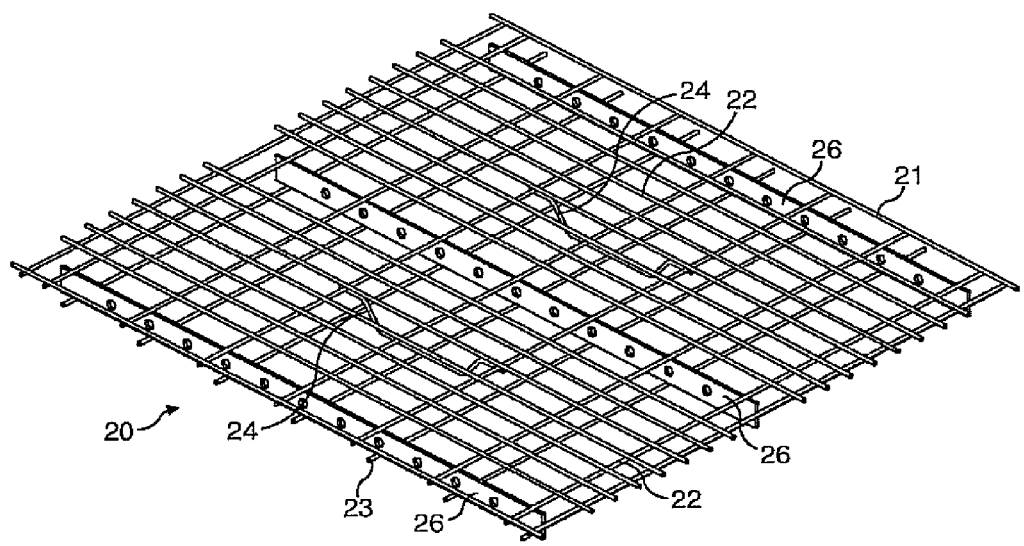
FIG. 2 is a perspective view of a wire frame structure comprising metal ribs for use according to the invention.

FIG. 2 shows a wire structure 20 which can be encased in plastics material to form a screen frame according to the invention. The structure 20 comprises a plurality of steel wires 22 bonded together and arranged to form an upper array 21 and a lower array 23. Spacers 24 are welded to wires in both the upper and lower arrays to maintain the desired separation distance. Three metal ribs 26 are positioned between the upper and lower arrays and are welded thereto. Holes are provided in the metal ribs to reduce weight and to allow flow of plastics during plastics encasing.

Figure 3:
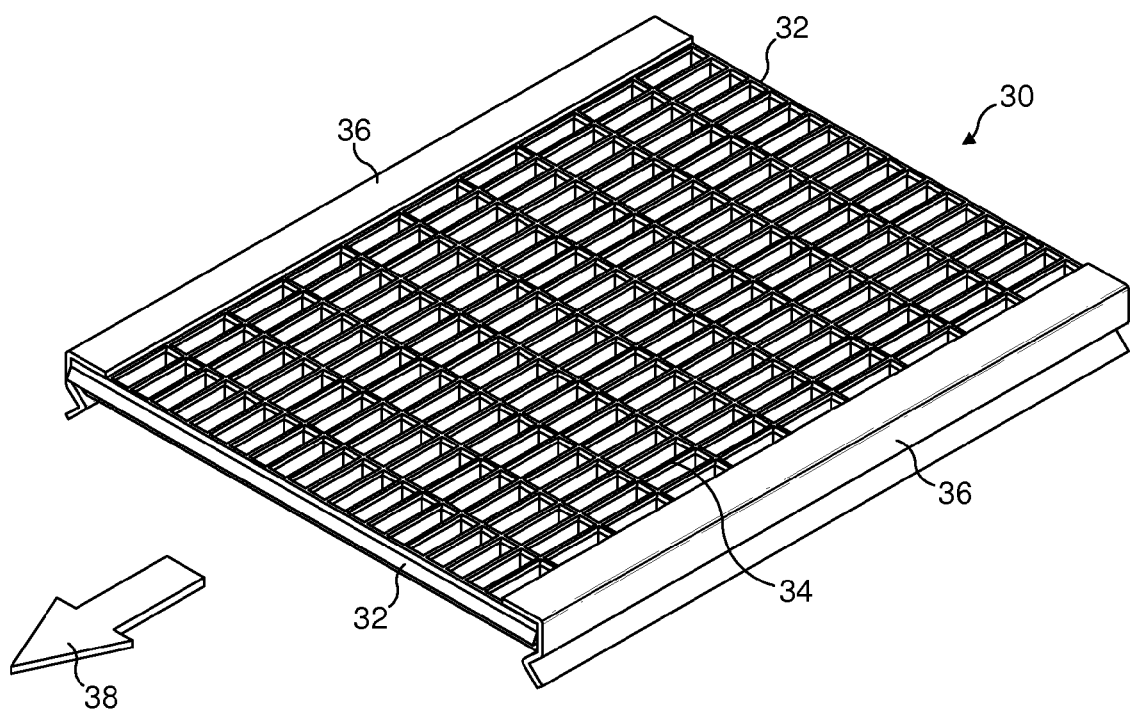
FIG. 3 is a perspective view of a screen frame according to the invention clamped in position.

FIG. 3 shows a screen frame 30 according to the invention comprising a wire structure (not shown) similar to that shown in FIG. 2 after being encased in GRP plastics material. The encasing process has produced a plastics rectangular perimeter 32 and an orthogonal array of plastics ribs 34 so that the metal structure is completely encased and all the plastics ribs 34 have the same dimensions in cross-section. The perimeter 32 is clamped at its long ends by clamps 36. The metal ribs (not shown) extend between opposing regions of the perimeter within respective plastics ribs 34 with their respective ends being located in clamped sides of the perimeter. Each metal rib also extends between the upper and lower face.

In use, the clamps 36 vibrate along the direction indicated by the arrow 38 and with an in-phase motion upwards and downwards, so that the frame vibrates in a direction parallel to the clamped sides and at 45° to the direction of arrow 38. The liquid/solid mixture (not shown) also passes across the upper face of the frame in a direction parallel to the clamped sides and in the direction of arrow 38.

The invention claimed is:

1. An apparatus comprising:
   a frame having a perimeter defining an interior area;
   a first plurality of plastic ribs extending between opposing regions of the perimeter of the frame, the first plurality of plastic ribs having an upper face and a lower face;
   a metal rib extending between opposing regions of the perimeter of the frame within the interior area of the frame perpendicular to the first plurality of plastic ribs and extending from the upper face to the lower face of the first plurality of plastic ribs; wherein the metal rib has a first side and a second side; wherein the second side is located in a position opposite the first side; and
   a first plurality of support rods embedded into the first plurality of plastic ribs; wherein the first plurality of support rods are attached to the metal rib and embedded into the first plurality of plastic ribs.

2. The apparatus of claim 1 further comprising:
   a second plurality of plastic ribs that extend between opposing regions of the perimeter of the frame perpendicular to the first plurality of plastic ribs forming a plurality of rectangular openings.

3. The apparatus of claim 1 which is adapted to be fitted in a shaker of a particular type and clamped on at least two sides of the frame.

4. The apparatus of claim 3, which is arranged such that the metal rib extends between regions of the perimeter of the frame which are, in use, clamped in place in the shaker.

5. The apparatus of claim 1 comprising one to five metal ribs.

6. The apparatus of claim 5 comprising two to four metal ribs.

7. The apparatus of claim 1 wherein the metal rib extends at least 90% of the distance between the opposing regions it extends between.

8. The apparatus of claim 1 wherein the metal rib extends from 50% to 100% of the distance from the upper face to the lower face.

9. The apparatus of claim 1, wherein the metal rib is encased in a plastic material.

10. The apparatus of claim 1 wherein the metal rib has a plurality of holes extending through the metal rib from the first side to the second side.

11. The apparatus of claim 2 wherein the metal rib is attached to a second plurality of support rods embedded in the second plurality of plastic ribs.

12. An apparatus comprising:
a perimeter frame defining an interior area;
an array of plastic ribs within the interior area of the perimeter frame forming a plurality of rectangular openings, the array of plastic ribs having an upper half and a lower half;
a plurality of metal support members embedded within the array of plastic ribs wherein the plurality of metal support members are parallel to each other and have a first side and a second side wherein the second side is located in a position opposite the first side; and
a first array of metal rods embedded into the upper half of the array of plastic ribs wherein the first array of metal rods is attached to the plurality of metal support members and embedded into the array of plastic ribs.

13. The apparatus of claim 12 further comprising:
a second array of metal rods embedded into the lower half of the array of plastic ribs wherein the second array of metal rods is attached to the plurality of metal support members.

14. The apparatus of claim 13 further comprising:
a plurality of spacers embedded into the array of plastic ribs connecting the first array of metal rods with the second array of metal rods.

15. The apparatus of claim 12 further comprising:
a plurality of holes extending through each of the plurality metal support members from the first side to the second side.

16. The apparatus of claim 12 wherein the plurality of metal support members extend into a portion of the perimeter frame.

17. An apparatus comprising:
a frame having ends and sides defining a perimeter;
an array of plastic ribs extending within the perimeter of the frame and forming a plurality of rectangular openings wherein the array of plastic ribs has an upper half and a lower half;
a plurality of metal support members having a top and a bottom embedded within the array of plastic ribs wherein the plurality of metal support members are parallel to each other;
a first array of metal rods embedded into the upper half of the array of plastic ribs wherein the first array of metal rods is attached to the top of the plurality of metal support members; and
a second array of metal rods embedded into the lower half of the array of plastic ribs wherein the second array of metal rods is attached to the bottom of the plurality of metal support members; wherein the first and second arrays of metal rods are embedded into the array of plastic ribs.

18. The apparatus of claim 17 wherein the plurality of metal support members extends between the ends of the frame.

19. The apparatus of claim 17 wherein the plurality of metal support members extends within the perimeter of the frame.

* * * * *